(No Model.)
J. M. HOWELL.
COTTON SEED PLANTER.
No. 313,938. Patented Mar. 17, 1885.
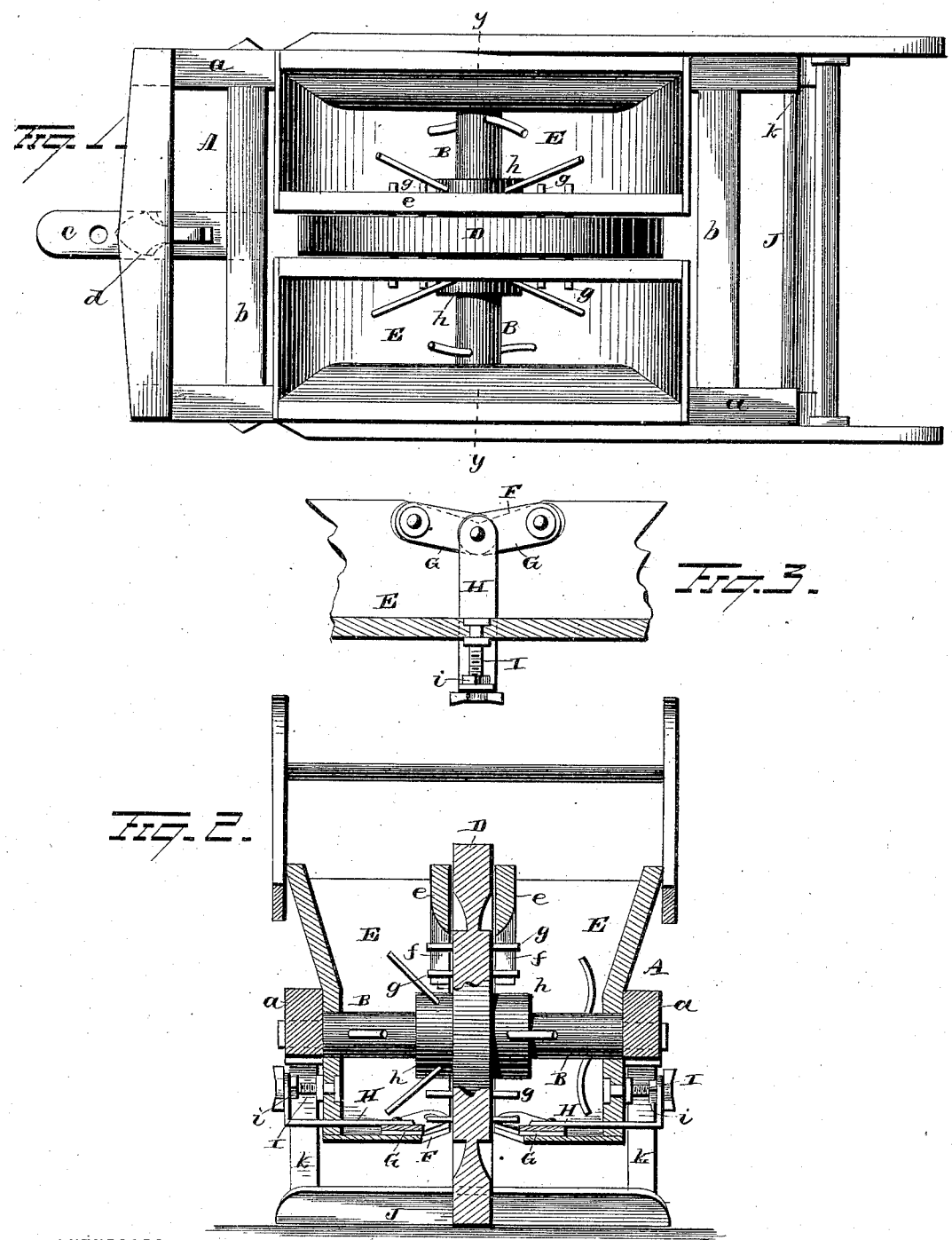
WITNESSES
Geo. F. Downing
Wm. T. Gill
INVENTOR
J. M. Howell
By H. A. Seymour, ATTORNEY

UNITED STATES PATENT OFFICE.

JESSE MARION HOWELL, OF GREENSBOROUGH, GEORGIA.

COTTON-SEED PLANTER.

SPECIFICATION forming part of Letters Patent No. 313,938, dated March 17, 1885.

Application filed August 12, 1884. (No model.)

*To all whom it may concern:*

Be it known that I, J. M. HOWELL, of Greensborough, in the county of Green and State of Georgia, have invented certain new and useful Improvements in Cotton-Seed Planters; and I do hereby declare the following to be a full, clear, and exact description of the invention, such as will enable others skilled in the art to which it appertains to make and use the same.

My invention relates to an improvement in cotton-seed planters, the object being to provide a planter which shall be simple and economical in construction, and at the same time durable in use, and which shall be capable of being adjusted for planting corn, peas, &c.; and with these ends in view my invention consists in certain novel features of construction and combinations of parts, as will be hereinafter described, and pointed out in the claims.

In the accompanying drawings, Figure 1 is a plan view of my improvement, and Fig. 2 is a sectional view thereof on the line $y\,y$ of Fig. 1. Fig. 3 is a detached view.

A represents the frame of the planter, composed of the two side beams, $a$, and the cross-pieces $b$, to the forward of which latter is secured the draft-beam $c$, provided with a tooth or spade, $d$, adapted to open a furrow, in which the grain is dropped.

In the beams $a$ are journaled the ends of the spindle or shaft B, to which is secured the wheel D, between which wheel and the side beams, $a$, are located the hoppers E, the bottoms of which hoppers are rounded. The sides $e$ of the hoppers nearest the wheel are cut away, as shown at $f$, thereby allowing the grain to fall against the wheel, which latter is provided with a series of horizontal pins or spikes, $g$, arranged in a circle on the wheel, the hub $h$ and the axle B of the wheel being also provided with a series of pins arranged in the form of a screw for the purpose of forcing the grain in the hoppers over toward the wheel.

The floor of each hopper near the wheel is provided with a V-shaped opening, F, over which fit the arms G, pivoted at their outer ends to the floor of the hopper. To the inner ends of these pivoted arms is pivotally secured the arm H, which extends through the outer side of the hopper and is bent up at right angles, and is provided with a hole or perforation near the end. Through this hole or perforation passes a screw, I, on which is fitted a lock-nut, $i$, adapted to hold the end of the arm H against the outer head of the screw or bolt I, and the inner end of which latter passes through the side of the hopper. It will now be seen that when the screw or bolt is turned outwardly the arm H will be pulled outwardly and the inner ends of the arms moved in a like direction, thus uncovering the opening in the floor of the hopper. By this arrangement of parts the size of the opening may be regulated in accordance to the size of the grain to be planted.

In each side of the wheel I form pockets or recesses, which fill with grain, and as the wheel revolves and the opening therein passes below the hopper the grain is discharged in the furrow formed by the tooth or plow $d$, the furrow being covered by the horizontal bar J, secured to the rear ends of the beams $a$ by means of the metal straps $k$, which latter allow the beam to ride over an obstruction without damage thereto, the planter being guided by means of handles K, secured to the side beams, $a$.

My invention is exceedingly simple in construction, and is capable of being adjusted for planting corn, peas, potatoes, &c., and can be manufactured at a small initial cost.

Having fully described my invention, what I claim as new, and desire to secure by Letters Patent, is—

1. The combination, with a frame and a wheel secured therein and projecting upwardly through the frame, of hoppers secured to the frame on opposite sides of the wheel, each hopper being provided at its lower end with an opening, arms pivoted at their outer ends to the floor of the hopper and their inner ends to an arm extending through the hopper, and a bolt or screw passing through the end of the arm and into the side of the hopper, substantially as set forth.

2. The combination, with a frame and a wheel secured therein, of hoppers secured to the frame and provided with V-shaped openings in the floor thereof, arms fitting over the openings and pivoted at their outer ends to the floor of the hopper and at their inner ends to an arm extending through the hopper, and a screw or bolt passing through the said latter arm and into the side of the hopper, and provided with a lock-nut fitting against the end of the arm, substantially as set forth.

In testimony whereof I have signed this specification in the presence of two subscribing witnesses.

JESSE MARION HOWELL.

Witnesses:
JOHN R. BRYANT,
W. S. DAVIS.